United States Patent
Yamamoto

(10) Patent No.: US 9,148,076 B2
(45) Date of Patent: Sep. 29, 2015

(54) METHOD FOR DRIVING ULTRASONIC MOTOR, ULTRASONIC MOTOR, AND ROBOT ARM

(71) Applicant: CANON KABUSHIKI KAISHA, Tokyo (JP)

(72) Inventor: Yuya Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 13/903,765

(22) Filed: May 28, 2013

(65) Prior Publication Data
US 2013/0319158 A1    Dec. 5, 2013

(30) Foreign Application Priority Data
May 30, 2012    (JP) .................................. 2012-122907

(51) Int. Cl.
*G05D 23/00* (2006.01)
*H02N 2/14* (2006.01)
*B25J 18/06* (2006.01)

(52) U.S. Cl.
CPC . *H02N 2/14* (2013.01); *B25J 18/06* (2013.01); *H02N 2/142* (2013.01); *Y10T 74/20317* (2015.01)

(58) Field of Classification Search
CPC ....................................................... H01L 41/08
USPC ......... 318/114, 128, 606, 799, 471, 472, 460, 318/607, 634, 686, 723, 807, 779; 310/316.01, 316.02, 317, 323, 323.02, 310/328; 700/245

See application file for complete search history.

(56) References Cited

U.S. PATENT DOCUMENTS

| | | | | |
|---|---|---|---|---|
| 5,644,199 A | * | 7/1997 | Nojima et al. | ................. 318/114 |
| 5,821,667 A | * | 10/1998 | Takagi et al. | ................. 310/317 |
| 2002/0089257 A1 | * | 7/2002 | Kato | ......................... 310/316.02 |
| 2009/0066187 A1 | * | 3/2009 | Kudo | ........................ 310/316.02 |

FOREIGN PATENT DOCUMENTS

| | | |
|---|---|---|
| CN | 1497831 A | 5/2004 |
| CN | 1601879 A | 3/2005 |
| CN | 201075846 Y | 6/2008 |
| JP | 6-296378 A | 10/1994 |
| JP | 7-59367 A | 3/1995 |

* cited by examiner

*Primary Examiner* — Antony M Paul
(74) *Attorney, Agent, or Firm* — Canon USA, Inc., IP Division

(57) ABSTRACT

A method for driving an ultrasonic motor includes setting an upper limit rotation speed that is lower than a rotation speed at a resonance frequency at a lowest temperature of a predetermined operating temperature range and a lower limit frequency that is more than or equal to a resonance frequency at a highest temperature of the operating temperature range, and, when the ultrasonic motor starts, a rotation speed of the ultrasonic motor becomes lower than the upper limit rotation speed and the ultrasonic motor is driven with a driving frequency which is higher than the lower limit frequency.

4 Claims, 11 Drawing Sheets

METHOD FOR DRIVING ULTRASONIC MOTOR, ULTRASONIC MOTOR, AND ROBOT ARM

BACKGROUND OF THE INVENTION

1. Field of the Invention

The present invention relates to an ultrasonic motor, a circuit for driving the ultrasonic motor, and a driving method using the circuit.

2. Description of the Related Art

In the related art, it is known that frequency characteristics of ultrasonic motors vary with changes in temperature, and therefore it is difficult to accurately control the operation of such motors. In general, as the temperature increases, the resonance frequency of an oscillator of an ultrasonic motor decreases and also a maximum rotation speed, which is a rotation speed obtained when the ultrasonic motor is driven at the resonance frequency, increases. When the ultrasonic motor is driven at a frequency lower than the resonance frequency of the oscillator of the ultrasonic motor, the operation becomes unstable, the rotation speed significantly decreases, and controllability deteriorates. In addition to this, in some cases, the flow of a large current damages the ultrasonic motor or a driving circuit.

Usually, when the ultrasonic motor in a resting state starts to be driven, an alternating-current driving voltage having a driving frequency, which is higher than the frequency to start the ultrasonic motor, is firstly applied. Then, the driving frequency is decreased to start rotating the ultrasonic motor and thus to adjust the rotation speed. In general, an operating temperature range of the ultrasonic motor is determined and a stable operation in the operating temperature range is demanded.

Thus, variations, due to temperature, in the resonance frequency of the oscillator of the ultrasonic motor have to be dealt with by using some technique and the motor has to be driven at a frequency higher than the resonance frequency at all times.

As a method to solve the above drawback, Japanese Patent Laid-Open No. 7-59367 discloses a method in which a memory that stores data regarding a lower limit frequency $fL$, which is a frequency higher than a resonance frequency at a lowest temperature of a predetermined operating temperature range, and an oscillation control circuit that performs control so that a frequency is higher than the lower limit frequency are used. This lowest temperature means a lower limit temperature in an operating temperature range that is estimated by the user.

FIG. 10 is a conceptual diagram illustrating a driving method for an ultrasonic motor described in Japanese Patent Laid-Open No. 7-59367. The estimated operating temperature range is −20° C. to +60° C. and FIG. 10 illustrates a relationship between a driving frequency f and a rotation speed N at typical temperatures of −20° C., +20° C., and +60° C. A common example of the relationship between the rotation speed of the ultrasonic motor and the applied driving frequency is illustrated in FIG. 10. As shown in the drawing, when the temperature increases, the resonance frequency decreases and the rotation speed at the resonance frequency increases.

In the case of driving at the lower limit frequency $fL$, suppose now that the rotation speeds at −20° C., +20° C., and +60° C. are NmL, NmM, and NmH, respectively, and the resonance frequencies at −20° C., +20° C., and +60° C. are frL, frM, and frH, respectively. Further, in the case of driving at the resonance frequencies at the respective temperatures, suppose now that the rotation speeds are NrL, NrM, and NrH. The terms, a highest temperature, means an upper limit temperature in the operating temperature range that is estimated by the user.

The lower limit frequency $fL$ is set to a frequency at which a rotation speed close to the maximum rotation speed NrL is obtained with stability at the above-set lowest temperature, and the frequency data is stored in the memory. In this state, the oscillation control circuit performs driving at a frequency higher than the lower limit frequency $fL$ on the basis of information stored in the memory. When driving is performed by using such a method, the driving frequency does not fall in a region of frequencies lower than all the resonance frequencies frL, frM, and frH over the entire temperature range.

As another method to solve the above drawback, Japanese Patent Laid-Open No. 6-296378 discloses a method in which a value of such a lower limit frequency is corrected on the basis of a temperature detected by a temperature sensor arranged in proximity to an ultrasonic motor.

FIG. 11 is a conceptual diagram illustrating changes in the lower limit frequency to be set on the basis of a temperature, which is described in Japanese Patent Laid-Open No. 6-296378.

As described above, because the resonance frequency of the ultrasonic motor varies with changes in temperature, the lower limit frequency is set with consideration of the temperature dependence of the resonance frequency. Specifically, data of the lower limit frequencies at temperatures illustrated in FIG. 11 are stored in a memory. Because the resonance frequency shifts to the lower frequency side with increasing temperature, the value of the lower limit frequency is set so as to decrease in accordance with that shift. When control is performed, the lower limit frequency corresponding to a temperature detected by the temperature sensor is read from the memory and is set. Because the lower limit frequency is set so as to be higher than the resonance frequency at each temperature, the driving frequency does not fall in a region of frequencies lower than the resonance frequencies in the respective temperature conditions.

SUMMARY OF THE INVENTION

In a driving circuit and the driving method for the ultrasonic motor described in Japanese Patent Laid-Open No. 7-59367, the ultrasonic motor may be driven only at a frequency higher than the predetermined lower limit frequency $fL$. For this reason, as is seen from FIG. 10, the maximum rotation speed at the lowest temperature is NmL, whereas the maximum rotation speed at the highest temperature falls to NmH. For example, in some types of motors or in some operating temperature ranges, the maximum rotation speed obtained after the temperature increases falls to about half the maximum rotation speed obtained before the temperature increases.

Because of this, it is difficult to apply the ultrasonic motor to industrial robots or the like in which significant changes in the temperature of the motor caused by frequently repeated starting and stopping of rotation occur and a constant maximum rotation speed has to be maintained regardless of temperature.

In the driving method for the ultrasonic motor described in Japanese Patent Laid-Open No. 6-296378, because the lower limit frequency changes in accordance with variations in the resonance frequency due to changes in temperature, a maximum rotation speed does not decrease; however, the sensor that detects a temperature is necessary, thereby resulting in an increase in cost.

The present invention provides a driving circuit and a driving method for an ultrasonic motor having a less expensive configuration in which, even when changes in temperature occur in the ultrasonic motor, variations in maximum rotation speed may be suppressed and a driving frequency does not become less than or equal to a resonance frequency at each temperature.

In a method for driving an ultrasonic motor according to the present invention, the ultrasonic motor is driven by applying an alternating-current driving voltage. The driving method includes setting an upper limit rotation speed Ns that is lower than a rotation speed at a resonance frequency at a lowest temperature of a predetermined operating temperature range and a lower limit frequency Fs that is more than or equal to a resonance frequency at a highest temperature of the operating temperature range, and, when the ultrasonic motor starts, a rotation speed of the ultrasonic motor becomes lower than the upper limit rotation speed Ns and a frequency control circuit outputs a driving frequency which is higher than the lower limit frequency Fs.

Further features of the present invention will become apparent from the following description of exemplary embodiments with reference to the attached drawings.

DESCRIPTION OF THE EMBODIMENTS

Exemplary embodiments for implementing the present invention will be described below with reference to the drawings.

First Embodiment

In this embodiment, on the basis of characteristics of an ultrasonic motor to be used, an operating temperature range of the ultrasonic motor that is driven by applying an alternating-current driving voltage is estimated to be +10° C. to +80° C.

Figure 1:
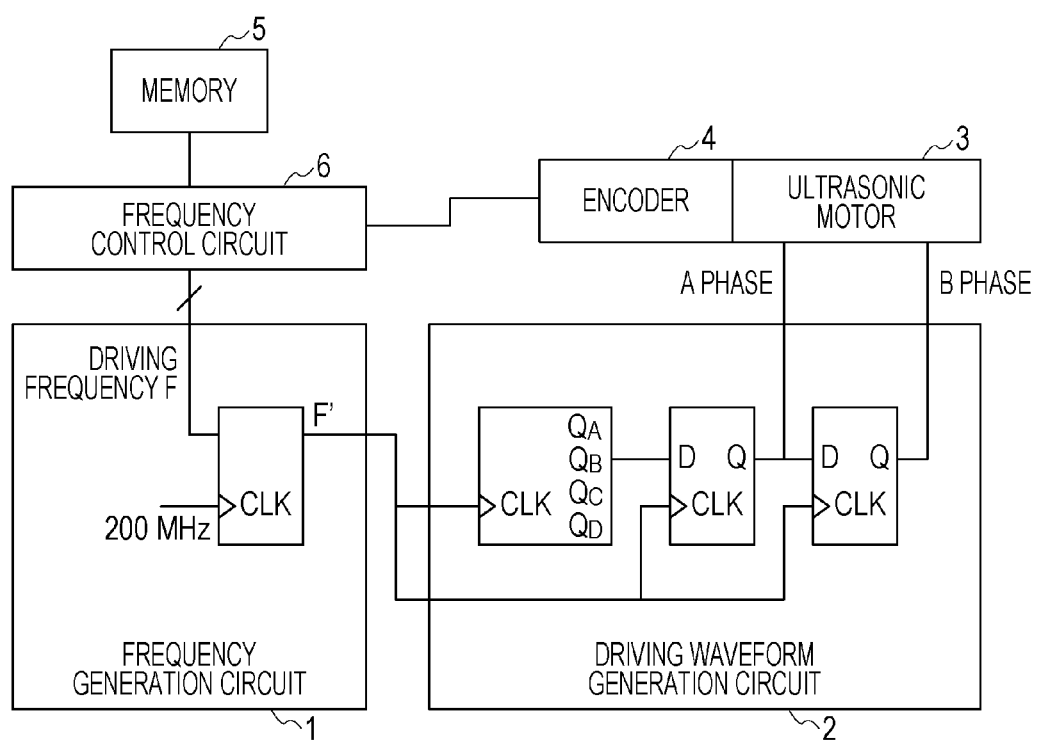
FIG. 1 is a schematic diagram illustrating a driving circuit for an ultrasonic motor.

FIG. 1 is a schematic diagram illustrating the basic configuration of a driving circuit that implements a method for driving an ultrasonic motor according to the present invention.

As illustrated in FIG. 1, the driving circuit that implements the method for driving the ultrasonic motor according to the present invention includes a frequency generation circuit 1, a driving waveform generation circuit 2, an ultrasonic motor 3, an encoder 4 serving as a rotation detection device, a memory 5, and a frequency control circuit 6.

The frequency generation circuit 1 is constituted by an 11-bit counter that is driven at a clock frequency of 200 MHz. When a signal having a driving frequency F output by the frequency control circuit 6, which will be described below, is input to the frequency generation circuit 1, it outputs a pulse signal F' having a frequency that is four times as high as the driving frequency F.

The driving waveform generation circuit 2 is constituted by a frequency divider and two D flip-flops that are driven by using, as a clock frequency, the output F' of the frequency generation circuit 1. As described below, the driving waveform generation circuit 2 is capable of generating two driving voltage waveforms that are 90 degrees out of phase.

The ultrasonic motor 3 is of a traveling-wave type and includes the encoder 4 that detects a current position related to a rotation angle of the ultrasonic motor 3 obtained after driving has started.

The memory 5 stores an upper limit rotation speed Ns and a lower limit frequency Fs.

Figure 2:
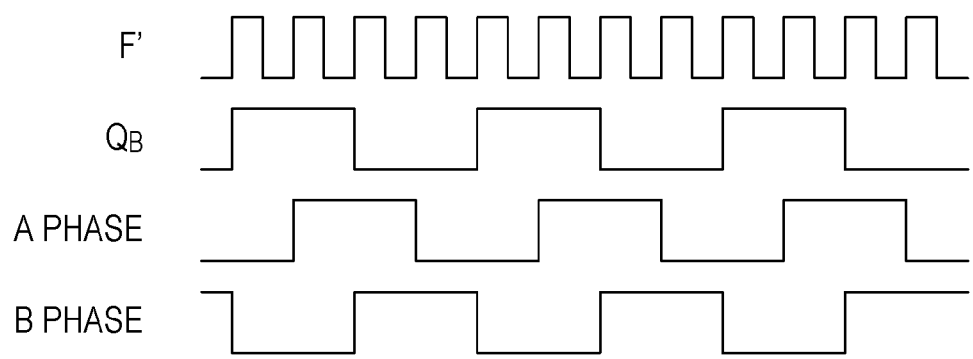
FIG. 2 illustrates two driving voltage waveforms in the driving circuit for the ultrasonic motor.

The frequency control circuit 6 calculates a current rotation speed Nn by using information on the current position related to the rotation angle of the ultrasonic motor 3 detected by the encoder 4. Then the frequency control circuit 6 calculates a subsequent command frequency Fc by using information on the current rotation speed Nn and a current driving frequency Fn, and outputs the subsequent command frequency Fc to the frequency generation circuit 1. A method of calculating the subsequent command frequency Fc will be described in detail in a driving method section. FIG. 2 illustrates two driving voltage waveforms in the driving circuit for the ultrasonic motor 3. The outputs of the two D flip-flops are out of phase with each other by 90 degrees, and two driving waveforms of an A phase and a B phase which are necessary to drive the ultrasonic motor 3 are output. The frequency of the driving waveforms of the A phase and the B phase is changed by the frequency control circuit 6 and the ultrasonic motor 3 is rotated at a rotation speed based on the driving frequency.

Figure 3:
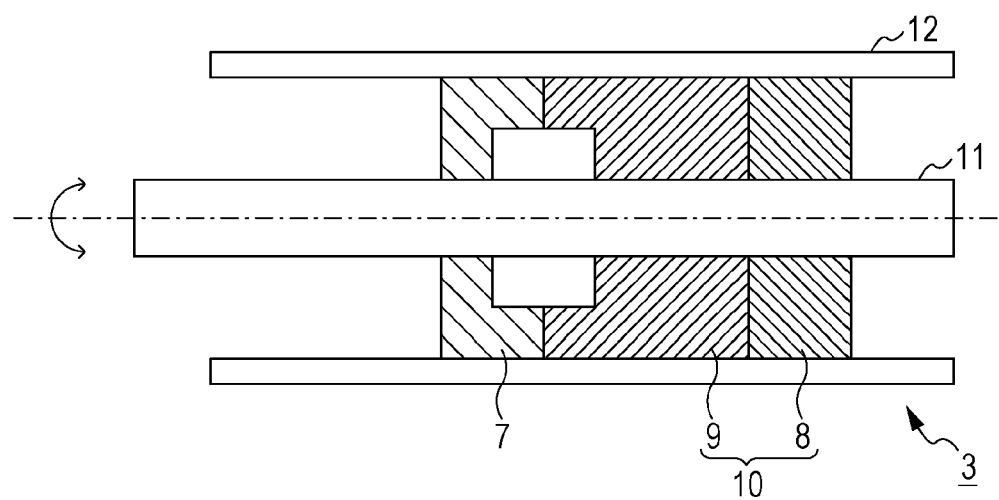
FIG. 3 is a cross-sectional view illustrating the structure of the ultrasonic motor.

FIG. 3 is a cross-sectional view illustrating the structure of the ultrasonic motor 3. The ultrasonic motor 3 includes a rotor 7, a vibrating body 10 composed of a piezoelectric element 8 and an elastic body 9, a shaft 11, and an outer casing 12. The rotor 7 and the vibrating body 10 are annular-shaped components and the outer casing 12 has a cylindrical shape. The shaft 11 and the rotor 7 are coupled to each other. The piezoelectric element 8 is caused to generate a traveling wave by the output of the driving circuit and the rotor 7 is driven, thereby causing rotary motion of the shaft 11.

Figure 4:
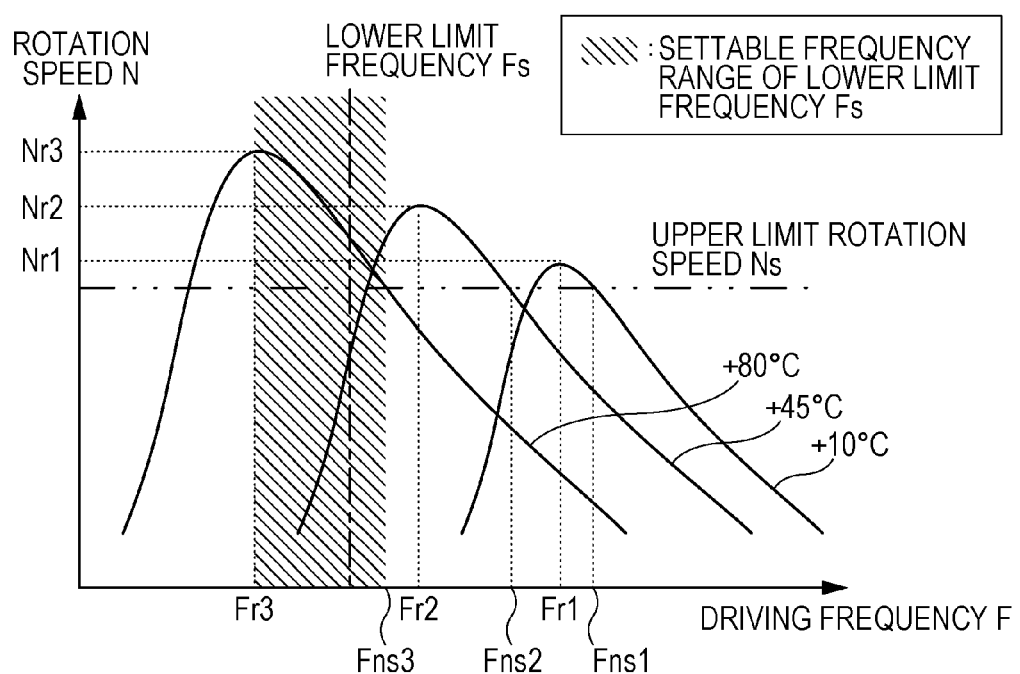
FIG. 4 illustrates temperature characteristics of the ultrasonic motor and a relationship between of an upper limit rotation speed Ns and a lower limit frequency Fs in a first embodiment.

Next, the driving method according to this embodiment will be described. FIG. 4 illustrates a relationship between a rotation speed N and the driving frequency F of the ultrasonic motor 3 at some temperatures. In FIG. 4, Ns denotes the upper limit rotation speed and Fs denotes the lower limit frequency. Fr1, Fr2, and Fr3 denote resonance frequencies at +10° C., +45° C., and +80° C., respectively. Nr1, Nr2, and Nr3 denote rotation speeds in the case of driving at the resonance frequencies at the respective temperatures. In the case where the ultrasonic motor 3 is driven at frequencies higher than the resonance frequencies at +10° C., +45° C., and +80° C., driving frequencies obtained when the rotation speeds reach the upper limit rotation speed Ns are Fns1, Fns2, and Fns3, respectively. Fns1 is the driving frequency corresponding to the set upper limit rotation speed Ns at a lowest temperature (here +10° C.) of the operating temperature range of +10° C. to +80° C. in this embodiment. In the following description, Fns1 may be called "Fns (low)" as necessary. On the other hand, Fns3 may be called "Fns (high)" because it is a value at a highest temperature of the operating temperature range. As for characteristics of the rotation speed with respect to the driving frequency of the ultrasonic motor 3 at each temperature, in the case where driving is performed at a frequency higher than the resonance frequency, as the frequency is decreased, the rotation speed increases, whereas, in the case where driving is performed at a frequency lower than the resonance frequency, as the frequency is decreased, the rotation speed decreases. Because the ultrasonic motor is generally driven at a frequency higher than the resonance frequency, a high-frequency driving voltage is applied so as to stop the ultrasonic motor 3 and the frequency is decreased, so that the ultrasonic motor 3 is operated at a desired rotation speed. At this time, the driving frequency is not changed to a value corresponding to a target rotation speed in one go but is gradually swept, thereby allowing stable control.

Figure 5:
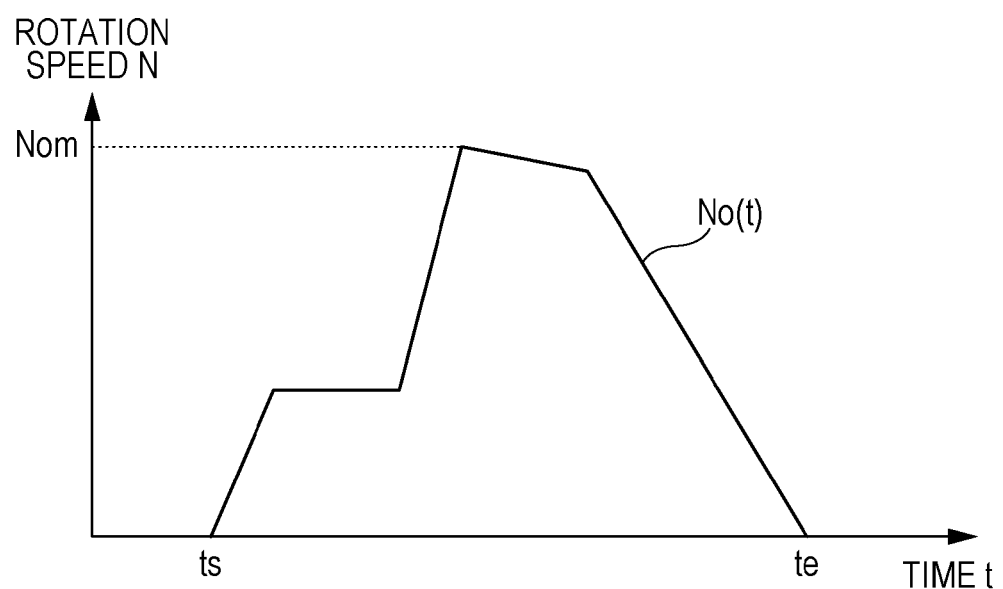
FIG. 5 is a schematic diagram illustrating a target rotation speed.

In order to determine the upper limit rotation speed Ns, first, with the ultrasonic motor 3 kept at the lowest temperature, a frequency within a range within which it is sufficiently higher than the resonance frequency Fr1 at the lowest temperature and within which the ultrasonic motor 3 is not driven is applied. Then, the ultrasonic motor 3 is driven while decrementing the driving frequency F by a constant value until the driving frequency F reaches the resonance frequency Fr1, and the rotation speed Nr1 obtained when the driving frequency F reaches the resonance frequency Fr1 is determined. Lastly, the upper limit rotation speed Ns is set so as to be between the rotation speed Nr1 at the resonance frequency Fr1 and a maximum value Nom of a target rotation speed No given when the ultrasonic motor 3 is driven. In this embodiment, as the target rotation speed No, a path No(t) of the rotation speed along which a value of the target rotation speed No changes in accordance with time is estimated (see FIG. 5). Here, t denotes time, and ts and te respectively denote a control start time and a control end time. In the case where the path of the target rotation speed illustrated in FIG. 5 is given, a value obtained when the target rotation speed reaches a maximum level is Nom.

In the present invention, first, the upper limit rotation speed Ns that is lower than the rotation speed at the resonance frequency at the lowest temperature of the predetermined operating temperature range and the lower limit frequency Fs that is more than or equal to the resonance frequency at the highest temperature of the operating temperature range are set. Then, the ultrasonic motor 3 may be driven at the driving frequency F at which the rotation speed of the ultrasonic motor 3 is lower than the upper limit rotation speed Ns and which is higher than the lower limit frequency Fs. In such a configuration, even when changes in temperature occur in the ultrasonic motor 3, variations in maximum rotation speed may be suppressed, the driving frequency does not become less than or equal to the resonance frequency at each temperature, and the ultrasonic motor 3 having a less expensive configuration may be driven.

In order to determine the lower limit frequency Fs, first, with the ultrasonic motor 3 kept at the highest temperature, a frequency within a range within which it is sufficiently higher than the resonance frequency Fr3 at the highest temperature and within which the ultrasonic motor 3 is not driven is applied. Then, with the ultrasonic motor 3 kept at the highest temperature, as described above, a high-frequency driving voltage is applied so as to stop the ultrasonic motor 3 and the driving frequency F is decreased until the rotation speed N of the ultrasonic motor 3 reaches the upper limit rotation speed Ns. A value of the driving frequency Fns3 (=Fns (high)) obtained when the rotation speed N reaches the upper limit rotation speed Ns is determined. The lower limit frequency Fs is set so as to fall within the range from the resonance frequency Fr3 to the driving frequency Fns3 (=Fns (high)). At this time, if the maximum value of the operating temperature range is set to a limit value of the increase in temperature of the ultrasonic motor 3, the motor temperature may exceed the limit value when driving continues at the lower limit frequency Fs. For this reason, it is more desirable to make allowance for the limit value of the motor temperature and set the maximum value of the operating temperature range. Such a set lower limit frequency Fs may effectively suppress a fall in rotation speed and maintain the maximum rotation speed even when driving is performed at a high temperature within the operating temperature range.

Figure 6:
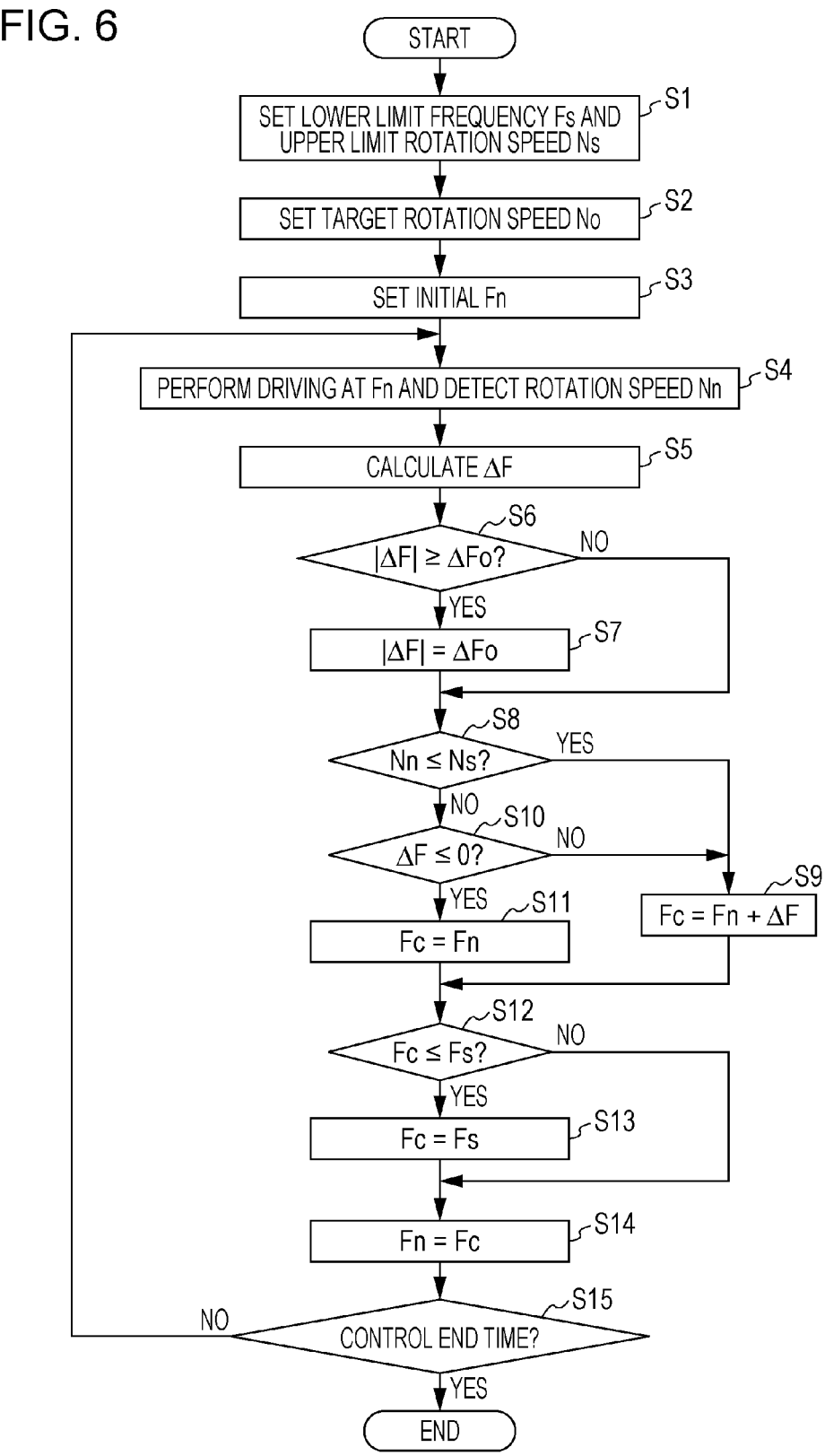
FIG. 6 is a flowchart illustrating a driving method for the ultrasonic motor.

FIG. 6 is a flowchart illustrating the driving method for the ultrasonic motor 3 according to the present invention.

First, the upper limit rotation speed Ns and the lower limit frequency Fs are written on the memory 5 (step S1). Then, the target rotation speed No is set (step S2). In addition, as the initial driving frequency Fn, a frequency that is sufficiently higher than the resonance frequency Fr1 at the lowest temperature is set (step S3).

Subsequently, driving is performed at the set driving frequency Fn and the current rotation speed Nn is detected (step S4), and a frequency change amount $\Delta F$ is calculated by using the target rotation speed No and the current rotation speed Nn (step S5). For example, if the assumption is made that a method of controlling the rotation speed N is P (proportional) control, a relationship of $\Delta F = k_p(Nn - No)$, where $k_p$ is a proportional gain, is valid. Here, an absolute value $|\Delta F|$ of the frequency change amount $\Delta F$ is compared with a predetermined upper limit value $\Delta Fo$ of the frequency change amount (step S6). If the value of $|\Delta F|$ is more than or equal to $\Delta Fo$, control is performed so as to satisfy a relationship of $|\Delta F| = \Delta Fo$ (step S7). Here, the upper limit value $\Delta Fo$ of the frequency change amount is set so that the value is a positive value that is smaller than an absolute value of a difference between the driving frequency Fns1 corresponding to the upper limit rotation speed Ns and the resonance frequency Fr1 at the lowest temperature. This may prevent the driving frequency from becoming less than or equal to the resonance frequency at each temperature. In addition, when the frequency change amount is less than or equal to $\Delta Fo$, driving may be performed while gradually sweeping the frequency, thereby allowing stable control. Subsequently, the upper limit rotation speed Ns is compared with the current rotation speed Nn (step S8). If the current rotation speed Nn is less than or equal to the upper limit rotation speed Ns, a value obtained by adding $\Delta F$ to the current driving frequency Fn is set as the subsequent command frequency Fc (step S9). If not, the sign of the frequency change amount $\Delta F$ is checked (step S10). When the sign of $\Delta F$ is positive, the value obtained by adding $\Delta F$ to the current driving frequency Fn is set as the command frequency Fc (step S9), and otherwise, the command frequency Fc is set to the same value as the current driving frequency Fn (step S11).

Furthermore, the command frequency Fc is compared with the lower limit frequency Fs (step S12). Only if the command frequency Fc is less than or equal to the value of the lower limit frequency Fs, the command frequency Fc is set to the same value as the lower limit frequency Fs (step S13). Lastly, as the driving frequency Fn, the value of the command frequency Fc is set (step S14). Then, the processes of steps S4 to S14 are repeatedly performed until the control end time to (step S15). The ultrasonic motor 3 is driven in accordance with the above method.

Figure 7A:
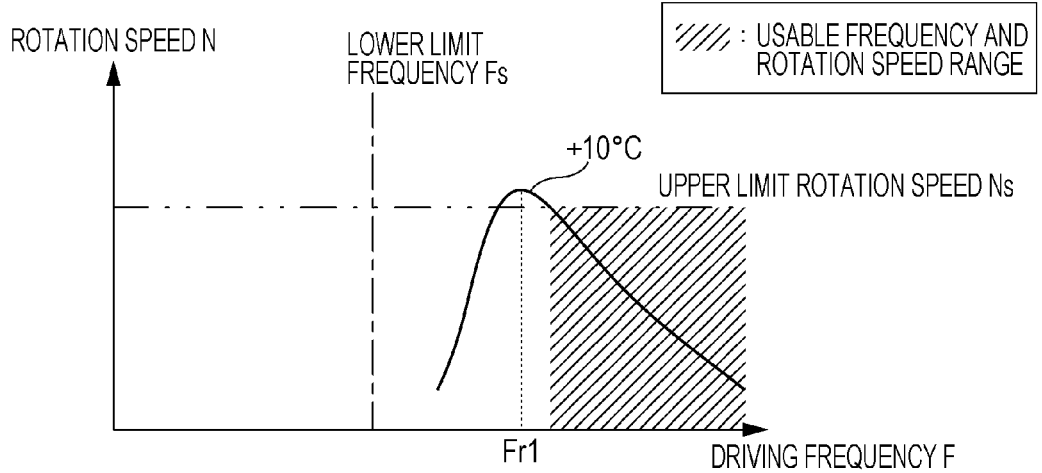
FIGS. 7A, 7B, and 7C each illustrate a usable frequency range at each temperature.
Figure 7B:
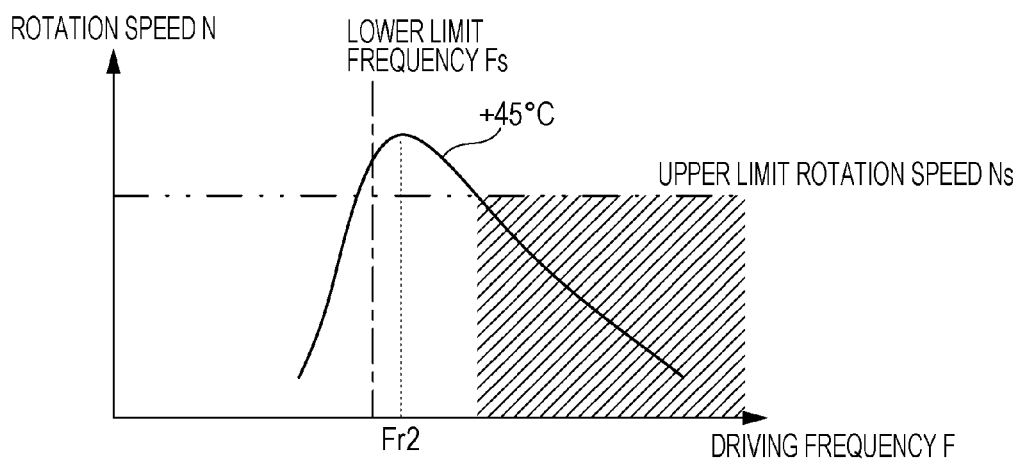
Figure 7C:
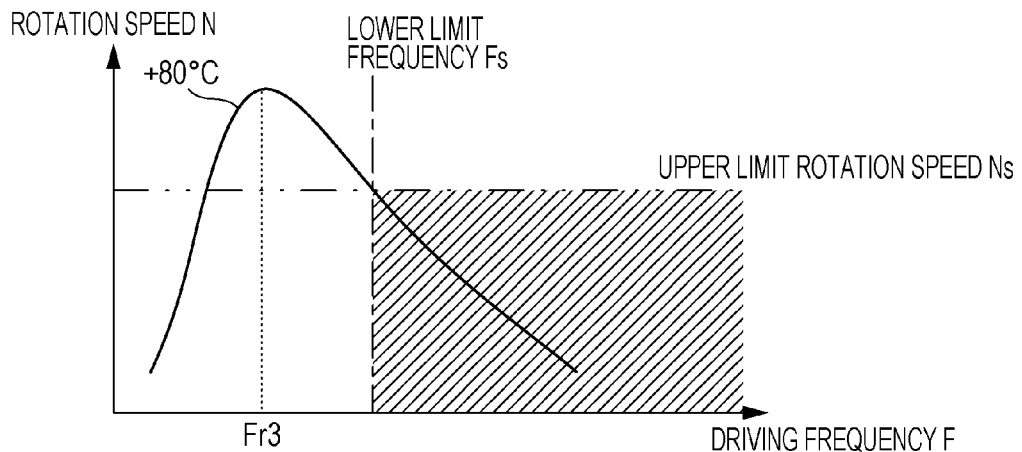

In the case where the ultrasonic motor 3 is driven in accordance with this embodiment, FIGS. 7A, 7B, and 7C illustrate usable frequency ranges at +10° C., +45° C., and +80° C., respectively. FIG. 7A will be described as an example. When the temperature of the ultrasonic motor 3 is +10° C., the driving frequency F does not become less than or equal to the resonance frequency Fr1 and stable driving may be performed. As illustrated in FIGS. 7B and 7C, in the case of the temperatures of +45° C. and +80° C. as well, the driving frequencies F do not become less than or equal to the respective resonance frequency Fr2 and Fr3. At all temperatures, the maximum rotation speed of the ultrasonic motor 3 may be increased up to the upper limit rotation speed Ns and a decrease in the maximum rotation speed with increasing temperature may be suppressed.

In the above-described embodiment, as for the frequency generation circuit 1 and the driving waveform generation circuit 2, other schemes may be used. In this embodiment, the operating temperature range is +10° C. to +80° C., or alternatively, is adaptable to a wider temperature range. In addition, in the method of calculating the frequency change amount $\Delta F$, not only P control but also another control scheme may be used. Furthermore, the method of giving the target rotation speed No may be another method.

Second Embodiment

Description of parts similar to those in the first embodiment is omitted and only different parts will be mainly described.

A settable range of the lower limit frequency Fs will be described by using FIG. 4.

In the second embodiment, the lower limit frequency Fs is set to be a frequency within a range from above the driving frequency Fns3 (=Fns (high)) corresponding to the upper limit rotation speed Ns at the highest temperature to the driving frequency Fns1 (=Fns (low)) corresponding to the upper limit rotation speed Ns at the lowest temperature. At this time, the lower limit frequency Fs is set in an area other than a diagonally shaded area in FIG. 4. In the first embodiment, in order to maintain the maximum rotation speed even at the highest temperature, the lower limit frequency Fs is set within the diagonally shaded area, whereas, in the second embodiment, in order to suppress an increase in temperature, the lower limit frequency Fs is set in the area which is higher than the diagonally shaded area.

Figure 9:
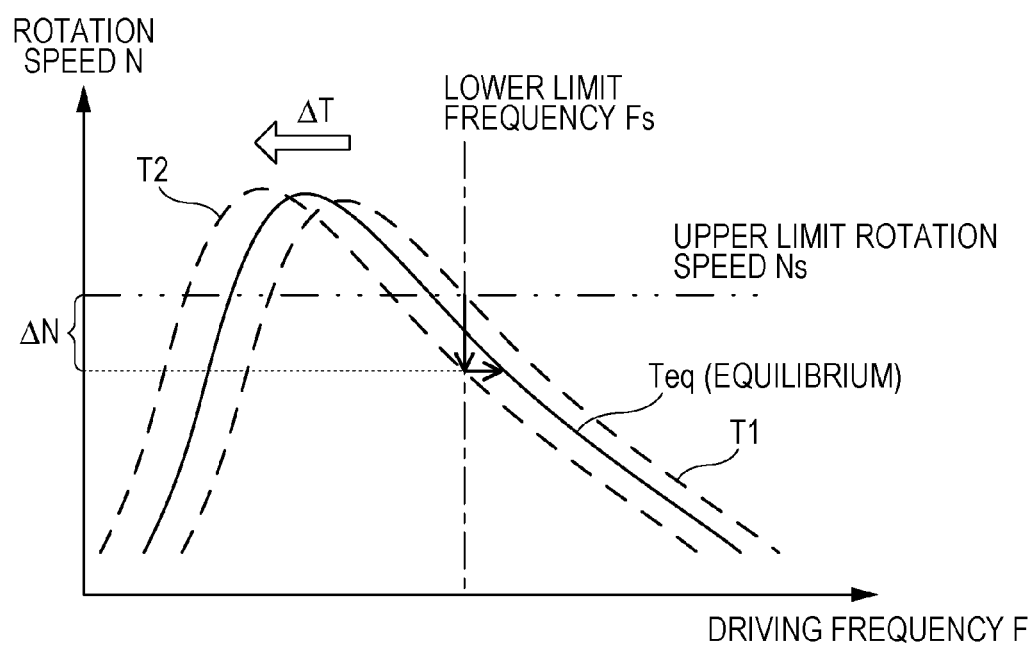
FIG. 9 illustrates a driving state of the ultrasonic motor in a second embodiment.
Figure 10:
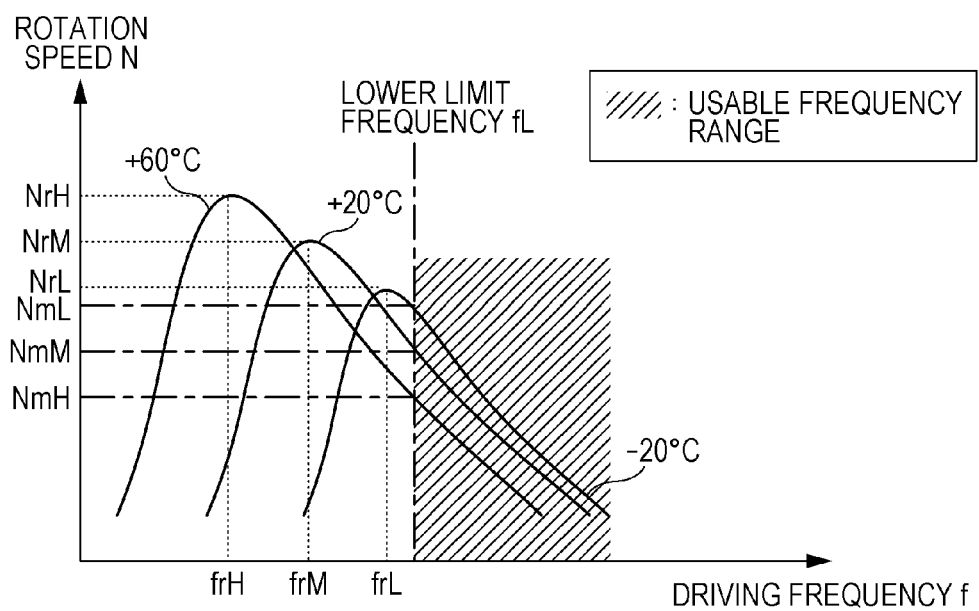
FIG. 10 illustrates temperature characteristics and a usable frequency range of an ultrasonic motor described in Japanese Patent Laid-Open No. 7-59367.
Figure 11:
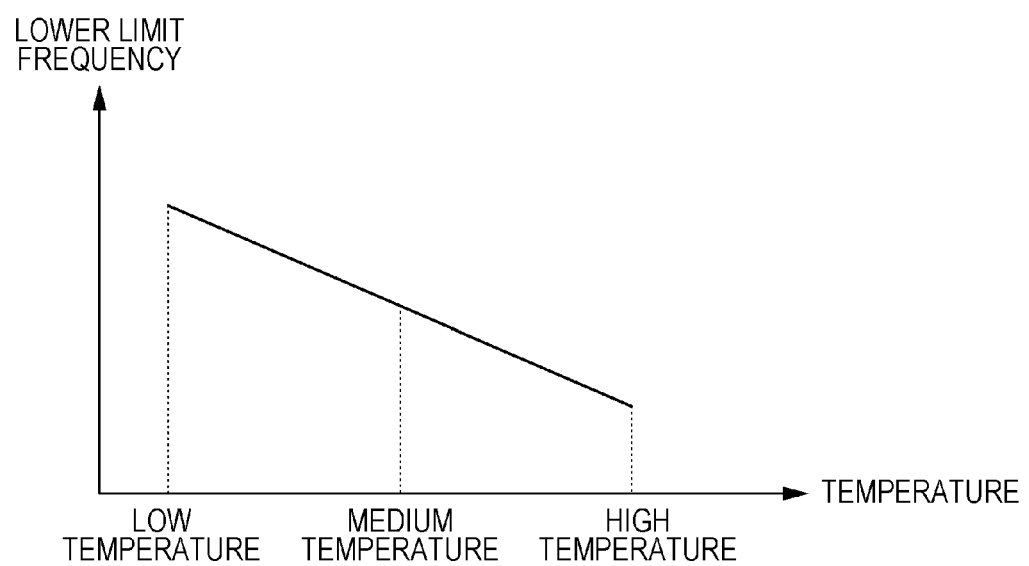
FIG. 11 is a conceptual diagram illustrating changes in a lower limit frequency based on a temperature, which is described in Japanese Patent Laid-Open No. 6-296378.

In the second embodiment, the above configuration prevents the motor temperature from reaching the upper limit of +80° C. in the operating temperature range. The reason will be described by using FIG. 9. In FIG. 9, when driving is performed at the lower limit frequency Fs, T1 denotes a temperature at which the rotation speed reaches the upper limit rotation speed Ns and T2 denotes a temperature which T1 reaches after being increased by a minute temperature $\Delta T$. The temperatures T1 and T2 are each lower than the upper limit of +80° C. in the operating temperature range and higher than the lower limit of +10° C. in the operating temperature range. Teq denotes a temperature specified between the temperatures T1 and T2. In the case where the ultrasonic motor 3 is driven in accordance with the driving method illustrated in FIG. 6, because the driving frequency does not become lower than the lower limit frequency Fs, when the temperature increases up to T2, the maximum rotation speed decreases by $\Delta N$ from the upper limit rotation speed Ns. The decrease in the rotation speed may provide a reserve allowing driving of the motor, so that the motor temperature decreases. In this way, the motor temperature increases, the driving frequency reaches the lower limit frequency Fs, the maximum rotation speed thereby decreases, and then the motor temperature decreases. These processes are repeated, so that the motor temperature reaches equilibrium at the temperature Teq. Because the temperature Teq is a value lower than the upper limit value in the operating temperature range, driving of the ultrasonic motor 3 at a temperature exceeding the upper limit temperature is suppressed.

As described above, driving of the ultrasonic motor at a temperature exceeding the operating temperature range leads to degradation of characteristics in which, for example, vibration of a piezoelectric element decreases. For this reason, when the second embodiment is used, the ultrasonic motor may be driven with high temperature-stability and more safety.

Third Embodiment

Figure 8:
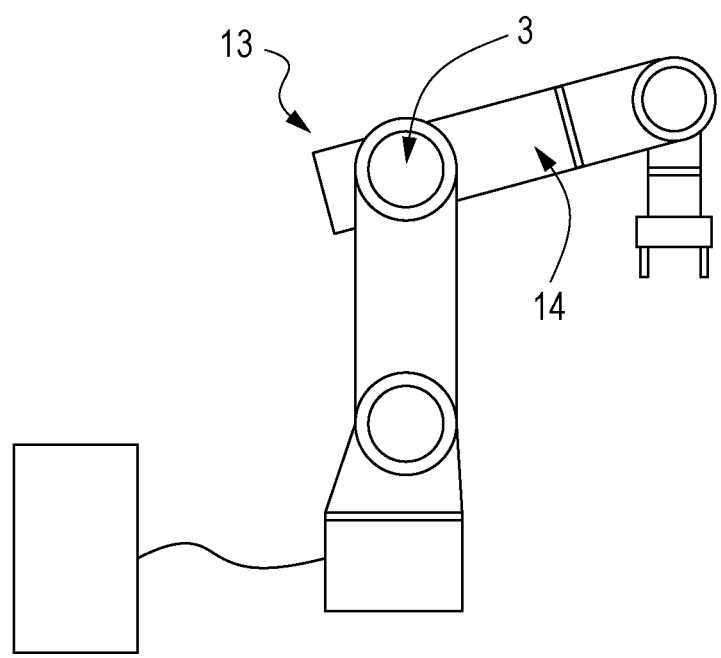
FIG. 8 illustrates a robot arm using the ultrasonic motor.

The ultrasonic motor 3 driven in accordance with the driving method of the present invention may be applied to a robot arm in which significant changes in the temperature of the motor caused by frequently repeated starting and stopping of rotation occur and a constant maximum rotation speed has to be maintained regardless of temperature. FIG. 8 schematically illustrates a robot arm. In a robot arm 13, a plurality of links 14 are coupled and each link 14 is driven by the ultrasonic motor 3 serving as an actuator.

In the driving circuit and the driving method for the ultrasonic motor according to the present invention, even when changes in temperature occur in the ultrasonic motor, variations in maximum rotation speed may be suppressed, the driving frequency does not become less than or equal to the resonance frequency at each temperature, and the ultrasonic motor having a less expensive configuration may be driven.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-122907 filed May 30, 2012, which is hereby incorporated by reference herein in its entirety.

What is claimed is:

1. A method for driving an ultrasonic motor that is driven by applying an alternating-current driving voltage, the method comprising:

setting, in a memory, an upper limit rotation speed that is lower than a rotation speed at a resonance frequency at a lowest temperature of a predetermined operating temperature range and a lower limit frequency that is more than or equal to a resonance frequency at a highest temperature of the operating temperature range;

wherein when the ultrasonic motor drives, a rotation speed of the ultrasonic motor detected by a rotation detection device becomes lower than the upper limit rotation speed and a frequency control circuit outputs a driving frequency which is higher than the lower limit frequency, and wherein the upper limit rotation speed is set to a speed between the rotation speed at the resonance frequency at the lowest temperature of the operating temperature range and a maximum value of a target rotation speed given when the ultrasonic motor is driven.

2. The method for driving the ultrasonic motor according to claim 1,
wherein the lower limit frequency is set to a frequency within a range from the resonance frequency at the highest temperature of the operating temperature range to a driving frequency corresponding to the upper limit rotation speed at the highest temperature of the operating temperature range.

3. The method for driving the ultrasonic motor according to claim 1,
wherein the lower limit frequency is set to a frequency within a range from above a driving frequency corresponding to the upper limit rotation speed at the highest temperature of the operating temperature range to a driving frequency corresponding to the upper limit rotation speed at the lowest temperature of the operating temperature range.

4. A robot arm in which a plurality of links are coupled and the links are driven by an actuator, wherein the actuator is the ultrasonic motor that includes a vibrating body which is driven by applying an alternating-current driving voltage and a rotor which is in contact with the vibrating body and is driven by vibration of the vibrating body, the ultrasonic motor comprising:
    a frequency generation circuit that outputs a signal having a frequency based on a frequency of an input signal;
    a driving waveform generation circuit that modulates the received signal into two signals having driving voltage waveforms which are 90 degrees out of phase;
    an encoder that detects a rotation angle of the ultrasonic motor;
    a memory that stores an upper limit rotation speed that is lower than a rotation speed at a resonance frequency at a lowest temperature of a predetermined operating temperature range and a lower limit frequency that is more than or equal to a resonance frequency at a highest temperature of the operating temperature range; and
    a frequency control circuit that controls the frequency generation circuit such that, when the ultrasonic motor drives, a rotation speed of the ultrasonic motor becomes lower than the upper limit rotation speed and the frequency control circuit outputs a driving frequency which is higher than the lower limit frequency on the basis of the upper limit rotation speed and the lower limit frequency which are stored in the memory.

* * * * *